United States Patent
Kim

(10) Patent No.: US 7,315,568 B2
(45) Date of Patent: Jan. 1, 2008

(54) MULTIPATH SEARCHING DEVICE AND METHOD THEREOF

(75) Inventor: Sang Choon Kim, Pusan (KR)

(73) Assignee: LG Electronics Inc., Seoul (KR)

( * ) Notice: Subject to any disclaimer, the term of this patent is extended or adjusted under 35 U.S.C. 154(b) by 825 days.

(21) Appl. No.: 10/688,651

(22) Filed: Oct. 16, 2003

(65) Prior Publication Data

US 2004/0081231 A1  Apr. 29, 2004

(30) Foreign Application Priority Data

Oct. 18, 2002 (KR) .................. 10-2002-0063935

(51) Int. Cl.
*H04B 1/707* (2006.01)
*H04B 7/02* (2006.01)

(52) U.S. Cl. ...................... 375/148; 375/267

(58) Field of Classification Search ........ 375/147–150, 375/152, 267, 317, 340, 347
See application file for complete search history.

(56) References Cited

U.S. PATENT DOCUMENTS

| 6,134,281 | A | * | 10/2000 | Green et al. | ............... 375/347 |
| 2002/0054621 | A1 | * | 5/2002 | Kyeong et al. | ............ 375/147 |
| 2002/0064216 | A1 | * | 5/2002 | Yule et al. | ................. 375/150 |

* cited by examiner

*Primary Examiner*—Don N. Vo
(74) *Attorney, Agent, or Firm*—Lee, Hong, Degerman, Kang & Schmadeka

(57) ABSTRACT

Disclosed is a multi-path searching device of a two-dimensional structure (time and space) wherein a beam-forming technique is applied to a conventional multi-path searching device. The device decreases interference, improves performance of the conventional multi-path searching device, and effectively reduces the MAI to increase not only the transmission capacity of a base station but also coverage of a cell.

30 Claims, 3 Drawing Sheets

MULTIPATH SEARCHING DEVICE AND METHOD THEREOF

CROSS REFERENCE TO RELATED APPLICATION

Pursuant to 35 U.S.C. § 119(a), this application claims the benefit of earlier filing date and right of priority to Korean Patent Application No. 2002-63935, filed on Oct. 18, 2002, the content of which is hereby incorporated by reference herein in its entirety.

BACKGROUND OF THE INVENTION

1. Field of the Invention

The present invention relates to a receiving device of a code division multiple access (CDMA) system, and more particularly to a multi-path searching system and method.

2. Description of the Related Art

Code Division Multiple Access (CDMA) is a method for transmitting simultaneous signals over a shared portion of the spectrum. The foremost application of CDMA is the digital cellular phone technology from QUALCOMM that operates in the 800 MHz band and 1.9 GHz PCS band, for example.

In a CDMA system, it is important to eliminate inter-chip interference (ICI) produced by a multi-path fading of a self signal. It is also important to reduce multiple access interference (MAI) in order to increase capacity of the system and improve call quality. A rake receiver is generally used in order to reduce the ICI. A beam forming method using an array antenna is used in order to reduce the MAI.

A smart antenna system receives only a signal transmitted from a desired direction, and restrains other signals transmitted from other directions. This selective reception scheme reduces the MAI and thereby increases a channel capacity of a base station. The smart antenna system controls gains and phases of signals received in each antenna device by using a plurality of arrangement antenna devices.

The smart antenna is divided into a multi-beam beam forming method for fixing a pattern of an antenna and an adaptive-beam beam forming method for changing a pattern of an antenna according to time and a communication environment. The multi-beam beam forming method is also called as a fixed-beam beam forming method.

In a typical receiver of a DS-CDMA communication system, a rake receiver is associated with one antenna. The rake receiver allocates fingers to a path of a signal having energy more than a threshold among the searched signals. At this time, in order to allocate the fingers to the path of each signal, a code timing of a corresponding path is provided. In order to synchronize the code timing, the multipath searcher is used.

The conventional multi-path searcher performs a dispreading for a search window size in order to synchronize the code timing, and gets energy of the disperesed signals. Then, the multi-path searcher compares a signal $Z_{max}$ having the largest energy value with a threshold. Herein, if the energy of the signal $Z_{max}$ is greater than the threshold, the signal $Z_{max}$ is set as a decision variable of the multi-path searcher. Said processes are repeated whenever slot data is received.

In order to reduce the ICI, an antenna diversity method was applied to the rake receiver in the conventional art. The rake receiver using the antenna diversity method has a high possibility to be adopted in WCDMA in the future. However, the antenna diversity method requires setting a predetermined distance between antennas. Further, the antenna diversity method cannot effectively reduce the MAI in a communication environment having many users.

SUMMARY OF THE INVENTION

In accordance to one or more embodiments, an object of the present invention is to provide a multi-path searching system and method that applies a beam-forming smart antenna technique to a conventional multi-path searcher.

In accordance to one or more embodiments, a multi-path searching device comprises a despreading unit for despreading received I and Q signals; an accumulator for accumulating the I and Q signals; a beam-forming unit for beam-forming the I and Q signals; an energy detecting unit for detecting a larger energy value between the energy values of the I and Q signals respectively; and a control unit for comparing the larger energy value with a threshold and setting a corresponding signal of the larger energy value as a decision variable, if the larger energy value is greater than the threshold.

The beam-forming unit comprises a plurality of beam-forming means and a plurality of antennas, wherein the beam-forming unit comprises as many beam-forming means as the plurality of antennas. In some embodiments, the beam-forming means is a switched beam-forming means and the plurality of beam-forming means are arranged in parallel.

The beam-forming means comprises a plurality of fixed-beam beam formers, wherein each of the beam-forming means comprises a plurality of fixed-beam beam formers, wherein number of the plurality of fixed-beam formers is approximately equal to number of antennas, for example.

In a certain embodiment, at least one of the fixed-beam beam formers outputs a beam-formed I signal by adding a value obtained from multiplying an accumulated I signal by a predetermined weight vector for an I signal to a value obtained by multiplying an accumulated Q signal by a predetermined weight vector for a Q signal. At least one of the fixed-beam beam formers outputs a beam-formed Q signal by adding a value obtained from multiplying the accumulated I signal by a predetermined weight vector for a Q signal to a value obtained by multiplying the accumulated Q signal by a predetermined weight vector for an I signal.

At least one of the fixed-beam beam formers obtains said beam-formed I signal $b_I^{(X,p-1)}$ and said beam-formed Q signal $b_Q^{(X,p-1)}$ based on the following:

$$b_I^{(X,p-1)} = Y_I \times W_I^{(X,p-1)}(\theta) + Y_Q \times W_Q^{(X,p-1)}(\theta); (X=0, 1, 2, 3, \ldots, P-1)$$

$$b_Q^{(X,p-1)} = Y_I \times W_Q^{(X,p-1)}(\theta) + Y_Q \times W_I^{(X,p-1)}(\theta); (X=0, 1, 2, 3, \ldots, P-1)$$

wherein the $W_I^{(X,p-1)}(\theta)$ denotes a weight vector for an I signal of $X^{th}$ fixed-beam beam former included $P^{th}$ beam-forming means, and the $W_Q^{(X,p-1)}(\theta)$ denotes a weight vector for a Q signal of $X^{th}$ fixed-beam beam former included $p^{th}$ beam-forming means.

For example, one of the beam-forming means respectively adds the beam-formed I signals and the beam-formed Q signals outputted from the fixed-beam beam formers to respectively produce an added I signal and an added Q signal. Said at least one beam-forming means respectively outputs the added I signal and the added Q signal.

In accordance with another embodiment, a multi-path searching method comprises despreading received I and Q signals; accumulating the despread I and Q signals respectively; splitting the despread I/Q signals by a plurality of beam-forming means; performing a beam-forming for the split I/Q signals; detecting energy of the beam-formed signals to find a largest energy value; comparing the detected largest energy value with a threshold; setting a corresponding signal of the largest energy value as a decision variable, if the largest energy value is greater than the threshold.

The I and Q signals are received via a plurality of antennas, and wherein the number of the beam-forming means is approximately equal to the number of the antennas. The plurality of beam-forming means are arranged in parallel. The beam-forming means is a switched beam-forming means. Each of the beam-forming means includes a plurality of fixed-beam beam formers.

The method of claim 14, wherein at least one of the beam-forming means comprises approximately same number of fixed-beam beam formers as that of the number of antennas. Each of the fixed-beam beam formers outputs a beam-formed I signal by adding a value obtained by multiplying the accumulated I signal by a predetermined weight vector for an I signal to a value obtained by multiplying the accumulated Q signal by a predetermined weight vector for a Q signal.

In certain embodiments, at least one of the fixed-beam beam formers outputs a beam-formed Q signal by adding a value obtained by multiplying the accumulated I signal by a predetermined weight vector for a Q signal to a value obtained by multiplying the accumulated Q signal by a predetermined weight vector for an I signal. At least one of the beam-forming means respectively adds the beam-formed I signals and the beam-formed Q signals outputted from the fixed-beam beam formers. At least one of the beam-forming means respectively outputs the added I signal and the added Q signal.

In accordance with yet another embodiment, a multi-path searching device comprises a despreading unit for despreading received I and Q signals; an accumulator for accumulating the I and Q signals; a beam-forming unit comprising a plurality of beam-forming means each comprising a plurality of fixed-beam beam formers for beam-forming the I and Q signals; an energy detecting unit for detecting a larger energy value between the energy values of the I and Q signals respectively; and a control unit for comparing the larger energy value with a threshold and setting a corresponding signal of the larger energy value as a decision variable, if the larger energy value is greater than the threshold.

At least one of the fixed-beam beam formers outputs a beam-formed I signal by adding a first value to a second value; the first value is obtained by multiplying an accumulated I signal by a predetermined weight vector for an I signal; the second value is obtained by multiplying an accumulated Q signal by a predetermined weight vector for a Q signal. At least one of the fixed-beam beam formers outputs a beam-formed Q signal by adding a third value to a fourth value.

In some embodiments, the third value is obtained by multiplying the accumulated I signal by a predetermined weight vector for a Q signal. The fourth value is obtained by multiplying the accumulated Q signal by a predetermined weight vector for an I signal. At least one of the fixed-beam beam formers obtains a beam-formed I signal $b_I^{(X,p-1)}$ and a beam-formed Q signal $b_Q^{(X,p-1)}$ based on the following:

$$b_I^{(X,p-1)} = Y_I \times W_I^{(X,p-1)}(\theta) + Y_Q \times W_Q^{(X,p-1)}(\theta); (X=0, 1, 2, 3, \ldots, P-1)$$

$$b_Q^{(X,p-1)} = Y_I \times W_Q^{(X,p-1)}(\theta) + Y_Q \times W_I^{(X,p-1)}(\theta); (X=0, 1, 2, 3, \ldots, P-1),$$

wherein the $W_I^{(X,p-1)}(\theta)$ denotes a weight vector for an I signal of $X^{th}$ fixed-beam beam former included $P^{th}$ beam-forming means, and the $W_Q^{(X,p-1)}(\theta)$ denotes a weight vector for a Q signal of $X^{th}$ fixed-beam beam former included $P^{th}$ beam-forming means.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1A:
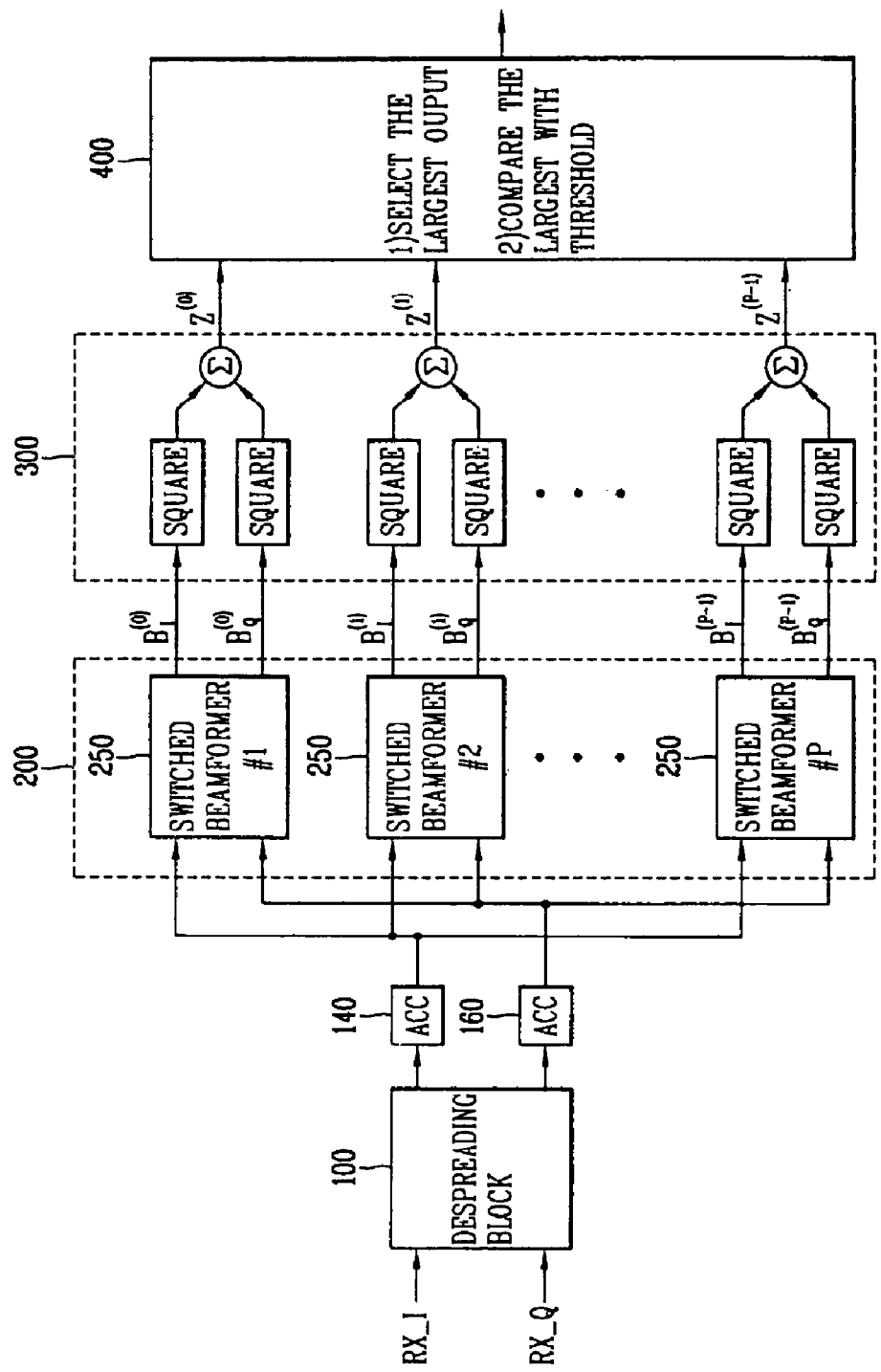
FIG. 1A is a structural view showing a multi-path searching device according to one embodiment the present invention.

Referring to FIG. 1A, in accordance to one embodiment, the multi-path searching device according to the present invention comprises: a despreading block 100, accumulators 140 and 160; a beam-forming unit 200; an energy detecting unit 300, and a control unit 400. The despreading block 100 performs a despreading operation for inputted signals (Rx_I, Rx_Q), and the accumulators 140 and 160 accumulate the despread I/Q signals, respectively.

Figure 1B:
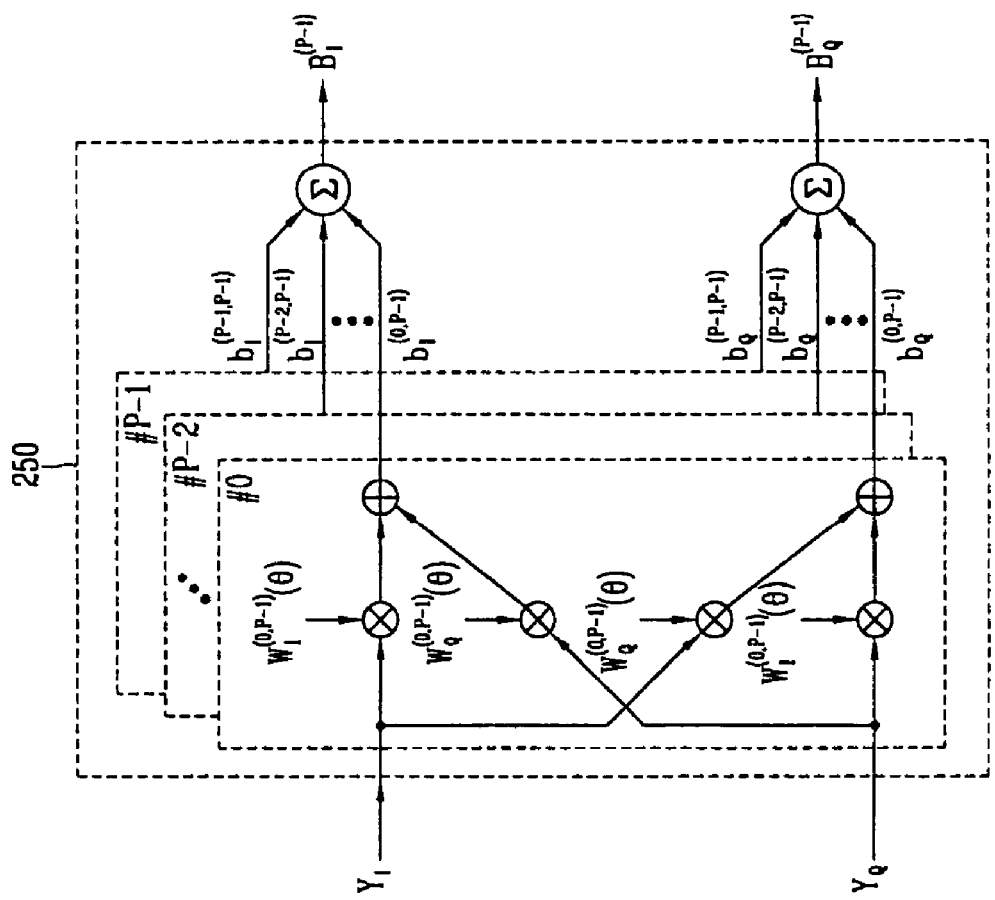
FIG. 1B is a structural view for a switched beam former of FIG. 1A.

The beam-forming unit 200 is located between the despreading block 100 and the energy detecting unit 300 to perform a beam-forming operation. In one embodiment, the beam-forming unit 200 comprises one or more switched beam formers 250. If the system comprises P antennas arranged in parallel then P beam formers 250 are respectively utilized, for example. Each of the switched beam formers 250 comprises a plurality of fixed-beam beam formers (FIG. 1B). In certain embodiments, each beam former may comprise P antennas.

In some embodiments, a beam-forming method is used to naturally spread a spectral analysis based on the Fourier transform into an arrangement antenna. The method improves the noise ratio for a signal by providing a great weight value to a signal of a specific incident on an antenna and to maximize an output value. That is, the beam-forming unit multiplies different weight values by signals collected into antennas and adds them, thereby restraining signals of undesired directions and thus serving as a spatial filter.

The energy detecting unit 300 for obtaining energy of signals squares I/Q signals which have passed through the beam-forming unit 200 respectively, and adds them together. The control unit 400 obtains a signal $Z_{max}$ having the largest energy value among detected signals $Z^0 \sim Z^{P-1}$. The control unit 400 compares the signal $Z_{max}$ with a threshold. If energy of the signal $Z_{max}$ is greater than the threshold, the signal $Z_{max}$ is set as a decision variable of the multi-path searching device. Said process is repeated whenever slot data is received, for example.

Figure 2:
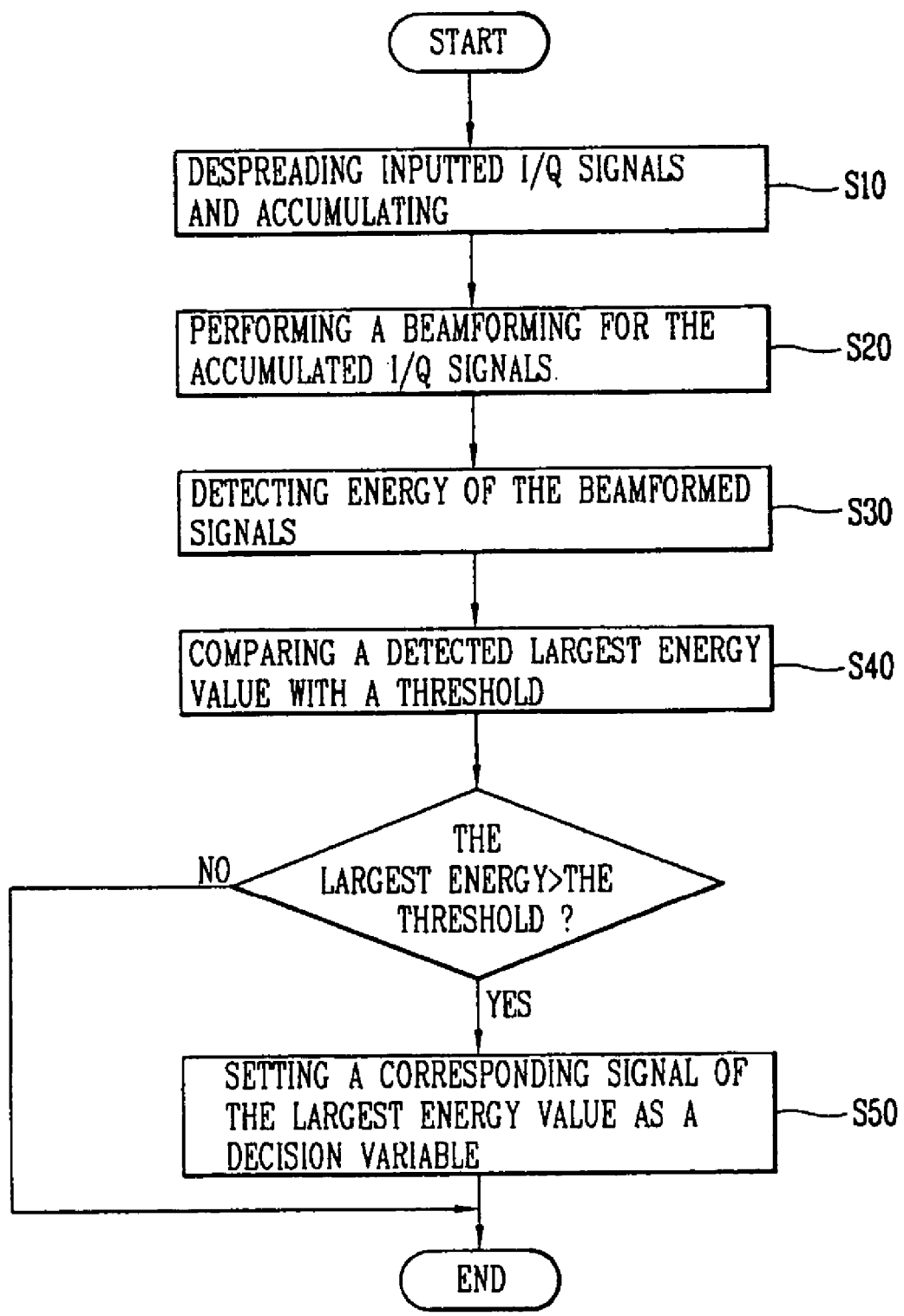
FIG. 2 is a flow chart of a multi-path searching method according to one embodiment of the present invention.

Referring to FIG. 2, a multi-path searching method according to one embodiment of the present invention comprises performing a despreading for inputted I and Q signals and accumulating the despread I and Q signals respectively (S10); splitting the despread I/Q signals by a plurality of beam-forming means 250 and performing a beam-forming for the split I/Q signals (S20); detecting energy of the beam-formed signals (S30); comparing the detected largest energy value with a threshold (S40); and setting a corresponding signal of the largest energy value as a decision variable, if the largest energy value is greater than the threshold (S50).

The multi-path searching device, according to the present invention, applies a fixed multi-beam-forming method and a smart antenna technique to the conventional multi-path searcher. In order to remove interference components which still exist at despread signals, the multi-path searching device processes received signals by an order of despreading, beam-forming, and energy-detecting.

In one embodiment, in order to improve a performing operation of the conventional multi-path searching device and to remove interference components which still exist at despread signals, the switched beam formers (or multi-beam beam formers) are used between the dispreading block and energy calculation devices.

Operations of the multi-path searching device according to the present invention is explained in more detail as follows. In accordance with one embodiment, signals collected into each antenna pass through an RF signal processing device (not shown) and an A/D converter (not shown). The signals are converted into processable digital signals (I/Q signals) in a receiving device, and are then inputted into the despreading block 100 of the multi-path searching device.

The despreading block 100 respectively performs a despreading for the inputted I/Q signals, and the despread I/Q signals are respectively synchronized and accumulated. Then, the accumulated I/Q signals are respectively transmitted to the beam-forming unit 200. The I/Q signals transmitted to the beam-forming unit 200 are split into each switched beam former 250 (0~P−1), and each of the switched beam formers 250 multiply the transmitted I/Q signals by weight vectors corresponding to different directions, thereby performing a beam-forming.

Beam-forming operations of each switched beam former 250 can be expressed by formulas as follows. If accumulated I and Q signals are split into each switched beam former 250, each fixed-beam beam former of the switched beam formers 250 outputs a beam-formed I signal (bI) by adding a value obtained by multiplying the accumulated I signal (YI) by a predetermined weight vector $W_I(\theta)$ for an I signal to a value obtained by multiplying the accumulated Q signal (YQ) by a predetermined weight vector $W_Q(\theta)$ for a Q signal, and outputs a beam-formed Q signal (bQ) by adding a value obtained by multiplying the accumulated I signal (YI) by a predetermined weight vector $W_Q(\theta)$ for a Q signal to a value obtained by multiplying the accumulated Q signal (YQ) by a predetermined weight vector $W_I(\theta)$ for an I signal.

In some embodiments, each of the beam-forming means respectively adds the beam-formed I signals and the beam-formed Q signals outputted from the fixed-beam beam formers, and respectively outputs the added I signal and the added Q signal. Operations of the switched beam formers can be expressed as follows, for example. The following formulas are for an operation of p-1$^{th}$ switched beam former.

[Formulas]

I signal $$b_I^{(0,p-1)} = Y_I \times W_I^{(0,p-1)}(\theta) + Y_Q \times W_Q^{(0,p-1)}(\theta)$$

$$b_I^{(1,p-1)} = Y_I \times W_I^{(1,p-1)}(\theta) + Y_Q \times W_Q^{(1,p-1)}(\theta)$$

$$b_I^{(p-1,p-1)} = Y_I \times W_I^{(p-1,p-1)}(\theta) + Y_Q \times W_Q^{(p-1,p-1)}(\theta)$$

$$B_I^{(p-1)} = \sum_{X=0}^{p-1} b_I^{(X,p-1)} = b_I^{(0,p-1)} + b_I^{(1,p-1)} + \cdots + b_I^{(p-1,p-1)}$$

Q signal $$b_Q^{(0,p-1)} = Y_I \times W_Q^{(0,p-1)}(\theta) + Y_Q \times W_I^{(0,p-1)}(\theta)$$

$$b_Q^{(1,p-1)} = Y_I \times W_Q^{(1,p-1)}(\theta) + Y_Q \times W_I^{(1,p-1)}(\theta)$$

$$b_Q^{(p-1,p-1)} = Y_I \times W_Q^{(p-1,p-1)}(\theta) + Y_Q \times W_I^{(p-1,p-1)}(\theta)$$

$$B_Q^{(p-1)} = \sum_{X=0}^{p-1} b_Q^{(X,p-1)} = b_Q^{(0,p-1)} + b_Q^{(1,p-1)} + \cdots + b_Q^{(p-1,p-1)}$$

The outputted signals (I/Q signals) of the switched beam formers 250 are respectively transmitted to the energy detecting unit 300. The energy detecting unit 300 detects energy of the transmitted I/Q signals. Outputted signals $Z^0 \sim Z^{p-1}$ of the energy detecting unit 300, that is, energy values of the signals result from that I/Q signals outputted from each of the switched beam formers 250 are respectively squared and added to each other.

The control unit 400 obtains a signal $Z_{max}$ having the largest energy value among the outputted signals $Z^0 \sim Z^{p-1}$ of the energy detecting unit 300, and then compares the signal $Z_{max}$ with a threshold. If energy of the signal $Z_{max}$ is greater than the threshold, the control unit 400 sets the signal $Z_{max}$ as a decision variable of the multi-path searching device. Said process is repeated whenever slot data is received, for example.

In accordance with one embodiment, the present invention is a multi-path searching device of a two-dimensional structure (time and space). A beam-forming technique is applied to the conventional multi-path searching device. The present invention decreases interference and improves performance of the conventional multi-path searching device. Also, the present invention can effectively reduces the MAI and thereby increases not only a capacity of a base station but also a coverage of a cell.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A multi-path searching device comprising:
   a despreading unit for despreading received I and Q signals;
   an accumulator for accumulating the despread I and Q signals from the dispreading unit;
   a beam-forming unit for beam-forming the accumulated I and Q signals from the accumulator;
   an energy detecting unit for detecting a larger energy value between the energy values of the I and Q signals respectively from the beam-forming unit; and
   a control unit for comparing the larger energy value detected by the energy detecting unit with a threshold and setting a corresponding signal of the larger energy value as a decision variable if the larger energy value is greater than the threshold.

2. The device of claim 1, wherein the beam-forming unit comprises a plurality of beam-forming means.

3. The device of claim 2, comprising a plurality of antennas, wherein the beam-forming unit comprises as many beam-forming means as the plurality of antennas.

4. The device of claim 2, wherein the beam-forming means is a switched beam-forming means.

5. The device of claim 2, wherein the plurality of beam-forming means are arranged in parallel.

6. The device of claim 2, wherein each of the beam-forming means comprises a plurality of fixed-beam beam formers.

7. The device of claim 3, wherein each of the beam-forming means comprises a plurality of fixed-beam beam formers, the number of fixed-beam beam formers equal to the number of antennas.

8. The device of claim 6, wherein at least one of the fixed-beam beam formers outputs a beam-formed I signal by adding a value obtained from multiplying an accumulated I signal by a predetermined weight vector for an I signal to a value obtained by multiplying an accumulated Q signal by a predetermined weight vector for a Q signal.

9. The device of claim 8, wherein at least one of the fixed-beam beam formers outputs a beam-formed Q signal by adding a value obtained from multiplying the accumulated I signal by a predetermined weight vector for a Q signal to a value obtained by multiplying the accumulated Q signal by a predetermined weight vector for an I signal.

10. The device of claim 9, wherein at least one of the fixed-beam beam formers obtains said beam-formed I signal $b_I^{(X,p-1)}$ and said beam-formed Q signal $b_Q^{(X,p-1)}$ based on the following:

$$b_I^{(X,p-1)} Y_I \times W_I^{(X,p-1)}(\theta) + Y_Q \times W_Q^{(X,p-1)}(\theta); (X=0, 1, 2, 3, \ldots, P-1)$$

$$b_Q^{(X,p-1)} Y_I \times W_Q^{(X,p-1)}(\theta) + Y_Q \times W_I^{(X,p-1)}(\theta); (X=0, 1, 2, 3, \ldots, P-1)$$

wherein the $W_I^{(X,p-1)}(\theta)$ denotes a weight vector for an I signal of Xth fixed-beam beam former included Pth beam-forming means, and the $W_I^{(X,p-1)}(\theta)$ denotes a weight vector for a Q signal of Xth fixed-beam beam former included Pth beam-forming means.

11. The device of claim 8, wherein at least one of the beam-forming means respectively adds the beam-formed I signals and the beam-formed Q signals outputted from the fixed-beam beam formers to respectively produce an added I signal and an added Q signal.

12. The device of claim 11, wherein the at least one beam-forming means respectively outputs the added I signal and the added Q signal.

13. A multi-path searching method comprising:
    despreading received I and Q signals;
    accumulating the despread I and Q signals respectively;
    splitting the despread I/O signals by a plurality of beam-forming means;
    performing a beam-forming for the split I/Q signals;
    detecting energy of the beam-formed signals to find a largest energy value;
    comparing the detected largest energy value with a threshold; and
    setting a corresponding signal of the largest energy value as a decision variable, if the largest energy value is greater than the threshold.

14. The method of claim 13, wherein the I and Q signals are received via a plurality of antennas, and wherein the number of beam-forming means is equal to the number of antennas.

15. The method of claim 13, wherein the plurality of beam-forming means are arranged in parallel.

16. The method of claim 13, wherein the beam-forming means is a switched beam-forming means.

17. The method of claim 13, wherein each of the beam-forming means includes a plurality of fixed-beam beam formers.

18. The method of claim 14, wherein at least one of the beam-forming means comprises the same number of fixed-beam beam formers as the number of antennas.

19. The method of claim 17, wherein each of the fixed-beam beam formers outputs a beam-formed I signal by adding a value obtained by multiplying the accumulated I signal by a predetermined weight vector for an I signal to a value obtained by multiplying the accumulated Q signal by a predetermined weight vector for a Q signal.

20. The method of claim 19, wherein at least one of the fixed-beam beam formers outputs a beam-formed Q signal by adding a value obtained by multiplying the accumulated I signal by a predetermined weight vector for a Q signal to a value obtained by multiplying the accumulated Q signal by a predetermined weight vector for an I signal.

21. The method of claim 19, wherein at least one of the beam-forming means respectively adds the beam-formed I signals and the beam-formed Q signals outputted from the fixed-beam beam formers.

22. The method of claim 21, wherein the at least one beam-forming means respectively outputs the added I signal and the added Q signal.

23. A multi-path searching device comprising:
    a despreading unit for despreading received I and Q signals;
    an accumulator for accumulating the despread I and Q signals from the dispreading unit;
    a beam-forming unit comprising a plurality of beam-forming means each comprising a plurality of fixed-beam beam formers for beam-forming the accumulated I and Q signals from the accumulator;
    an energy detecting unit for detecting a larger energy value between the energy values of the I and Q signals respectively from the beam-forming unit; and
    a control unit for comparing the larger energy value with a threshold and setting a corresponding signal of the larger energy value as a decision variable, if the larger energy value is greater than the threshold.

24. The multi-path searching device of claim 23, wherein at least one of the fixed-beam beam formers outputs a beam-formed I signal by adding a first value to a second value.

25. The multi-path searching device of claim 24, wherein the first value is obtained by multiplying an accumulated I signal by a predetermined weight vector for an I signal.

26. The multi-path searching device of claim 24, wherein the second value is obtained by multiplying an accumulated Q signal by a predetermined weight vector for a Q signal.

27. The multi-path searching device of claim 23, wherein at least one of the fixed-beam beam formers outputs a beam-formed Q signal by adding a third value to a fourth value.

28. The multi-path searching device of claim 27, wherein the third value is obtained by multiplying the accumulated I signal by a predetermined weight vector for a Q signal.

29. The multi-path searching device of claim 27, wherein the fourth value is obtained by multiplying the accumulated Q signal by a predetermined weight vector for an I signal.

30. The multi-path searching device of claim 23, wherein at least one of the fixed-beam beam formers obtains a beam-formed I signal $B_I^{(X,p-1)}$ and a beam-formed Q signal $b_Q^{(X,p-1)}$ based on the following:

$$b_I^{(X,p-1)} Y_I \times W_I^{(X,p-1)}(\theta) + Y_Q \times W_Q^{(X,p-1)}(\theta); (X=0, 1, 2, 3, \ldots, P-1)$$

$$b_I^{(X,p-1)} Y_I \times W_Q^{(X,p-1)}(\theta) + Y_Q \times W_I^{(X,p-1)}(\theta); (X=0, 1, 2, 3, \ldots, P-1)$$

wherein the $W_I^{(X,p-10)}(\theta)$ denotes a weight vector for an I signal of Xth fixed-beam beam former included Pth beam-forming means, and the $W_Q^{(X,p-1)}(\theta)$ denotes a weight vector for a Q signal of Xth fixed-beam beam former included Pth beam-forming means.

* * * * *